United States Patent
Cheng et al.

(10) Patent No.: US 12,499,324 B2
(45) Date of Patent: Dec. 16, 2025

(54) PERSONALIZED BRANDING WITH PROMPT ADAPTATION IN LARGE LANGUAGE MODELS AND VISUAL LANGUAGE MODELS

(71) Applicant: Microsoft Technology Licensing, LLC, Redmond, WA (US)

(72) Inventors: Mingxi Cheng, Los Angeles, CA (US); Ji Li, San Jose, CA (US); Dachuan Zhang, Sunnyvale, CA (US); Veena Gopalakrishna Joshi, Mountain View, CA (US); Andi Chen, Emeryville, CA (US); Sumithra Bhakthavatsalam, Kirkland, WA (US); Maya Bisineer, Cupertino, CA (US); Greeshma Marri, Everett, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 18/483,587

(22) Filed: Oct. 10, 2023

(65) Prior Publication Data

US 2025/0117998 A1 Apr. 10, 2025

(51) Int. Cl.
| | |
|---|---|
| G06F 40/40 | (2020.01) |
| G06F 40/30 | (2020.01) |
| G06Q 30/0201 | (2023.01) |
| G06T 11/00 | (2006.01) |
| G06T 11/60 | (2006.01) |

(52) U.S. Cl.
CPC .............. *G06F 40/40* (2020.01); *G06F 40/30* (2020.01); *G06Q 30/0201* (2013.01); *G06T 11/001* (2013.01); *G06T 11/60* (2013.01); *G06T 2200/24* (2013.01)

(58) Field of Classification Search
CPC ...................................... G06T 11/60
See application file for complete search history.

(56) References Cited

U.S. PATENT DOCUMENTS

| | | | |
|---|---|---|---|
| 11,809,688 B1 * | 11/2023 | Parasnis | G06F 3/04845 |
| 2023/0169261 A1 * | 6/2023 | Vong | G06F 40/106 |
| | | | 715/255 |
| 2025/0103801 A1 * | 3/2025 | Child | G06F 40/20 |
| 2025/0104310 A1 * | 3/2025 | Katz | G06F 40/40 |

* cited by examiner

*Primary Examiner* — Douglas Godbold
(74) *Attorney, Agent, or Firm* — Novo TechIP International PLLC

(57) ABSTRACT

A data processing system implements techniques for generating personalized content using a brand kit. The system receives a natural language prompt to generate content in a design application on the client device of a user and analyzes the prompt to determine whether the user intends to apply a brand kit to the generated content. The system automatically generates a brand kit for the user if one does not already exist and applies the brand kit to content generated using one or more generative models to create personalized content. The system includes a prompt generation unit that generates a plurality of model-specific prompts to the one or more generative models to cause the one or more generative models to create the personalized content.

20 Claims, 15 Drawing Sheets

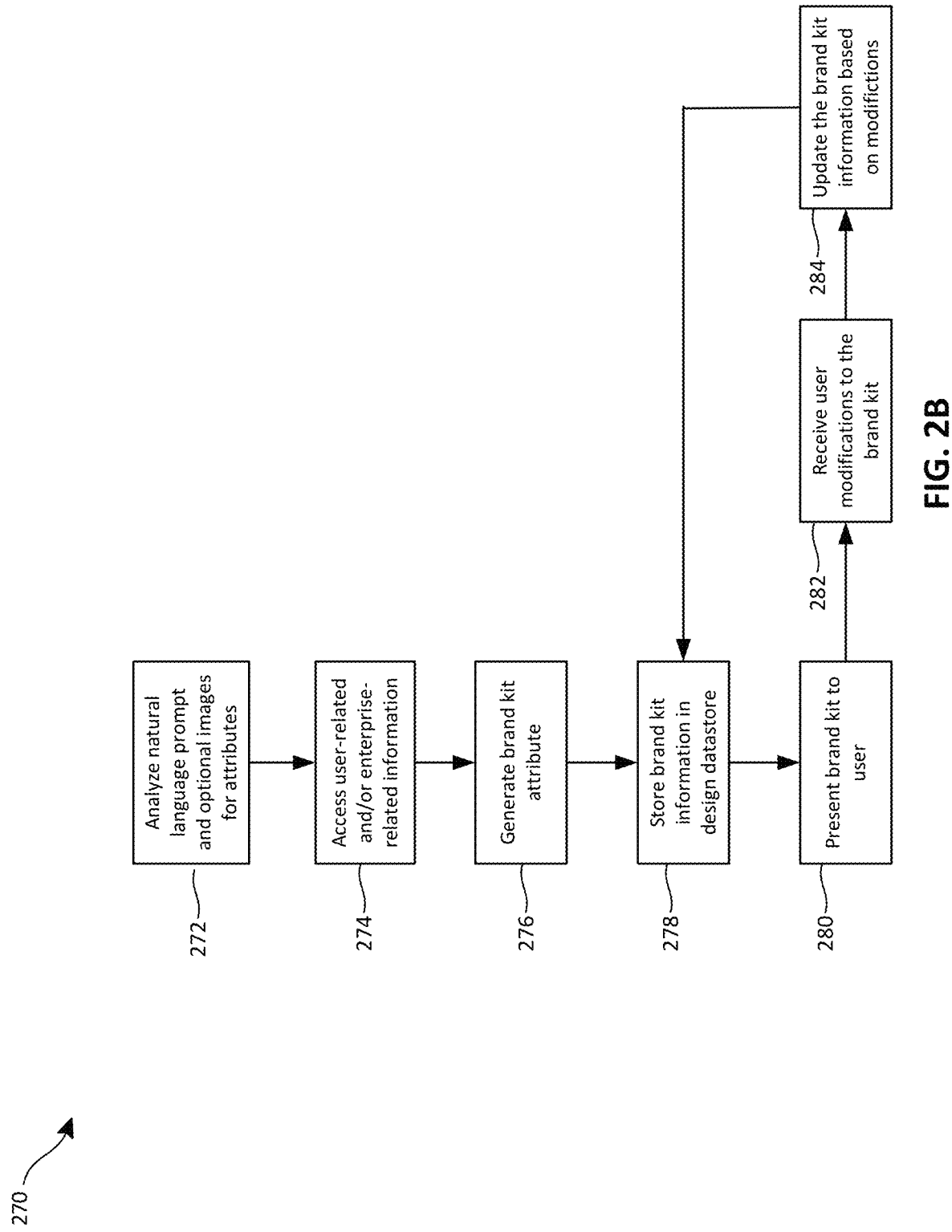

PERSONALIZED BRANDING WITH PROMPT ADAPTATION IN LARGE LANGUAGE MODELS AND VISUAL LANGUAGE MODELS

BACKGROUND

Design applications provide users with the ability to create professional quality content graphics, illustrations, and other content, such as but not limited to social media posts, invitations, graphics, posters, and/or advertisements. Often users of these design application are designing content for an enterprise or other entity is associated with a brand that conveys a unique and recognizable identity of the enterprise or other entity. One way that designers capture the attributes of the brand's visual identity is to create a brand kit. A brand kit is a set of assets or a toolbox that includes various aspects of the brand's visual identity that can be applied when creating new content. These aspects can include but not limited to logos, templates for laying out content, color palettes to utilize in the content, fonts typically used to create content for the brand, images, and/or other graphical content. The brand kits organize these assets into one place and provide a reference that enables designers to create content that is consistent with the brand's visually identity. Creating a brand kit is currently a manual process in which the assets are manually added. Furthermore, some users may be unaware that the design applications provide tools for creating and utilizing brand kits. Hence, there is a need for improved systems and methods that provide means for automatically generating and applying brand kits to content.

SUMMARY

An example data processing system according to the disclosure includes a processor and a memory storing executable instructions. The instructions when executed cause the processor alone or in combination with other processors to perform operations including receiving a natural language prompt input by a user of a design application, the natural language prompt requesting that the design application generate content described in the natural language prompt; analyzing the natural language prompt using a first language model trained to output a prediction whether the user intended to generate personalized content using a brand kit comprising a set of electronic assets providing example of a visual identity of a brand associated with the user; responsive to the first language model outputting a prediction that the user intended to generate personalized content using a brand kit, obtaining a brand kit associated with the user; generating intermediate content based on the natural language prompt by generating a plurality of first model-specific prompts, each model-specific prompt of the first model-specific prompts being provided as an input to a respective generative model of a plurality of generative models associated with the designer application to cause the respective generative model to generate at least one aspect of the intermediate content; and customizing the intermediate content to create personalized content based on the brand kit by generating a plurality of second model-specific prompts, each model-specific prompt of the second model-specific prompts being provided as an input to a respective generative model of the plurality of generative models to cause the respective generative model to generate at least one aspect of the personalized content based on the brand kit.

An example method implemented in a data processing system includes receiving a natural language prompt input by a user of a design application, the natural language prompt requesting that the design application generate content described in the natural language prompt; analyzing the natural language prompt using a first language model trained to output a prediction whether the user intended to generate personalized content using a brand kit comprising a set of electronic assets providing example of a visual identity of a brand associated with the user; responsive to the first language model outputting a prediction that the user intended to generate personalized content using a brand kit, obtaining a brand kit associated with the user; generating intermediate content based on the natural language prompt by generating a plurality of first model-specific prompts using a prompt construction layer, each model-specific prompt of the first model-specific prompts being provided as an input to a respective generative model of a plurality of generative models associated with the designer application to cause the respective generative model to generate at least one aspect of the intermediate content; and customizing the intermediate content to create personalized content based on the brand kit by generating a plurality of second model-specific prompts using the prompt construction layer, each model-specific prompt of the second model-specific prompts being provided as an input to a respective generative model of the plurality of generative models to cause the respective generative model to generate at least one aspect of the personalized content based on the brand kit.

An example data processing system according to the disclosure includes a processor and a memory storing executable instructions. The instructions when executed cause the processor alone or in combination with other processors to perform operations including receiving a natural language prompt input by a user of a design application, the natural language prompt requesting that the design application generate content described in the natural language prompt; analyzing the natural language prompt using a first language model trained to output a prediction whether the user intended to generate personalized content using a brand kit comprising a set of electronic assets providing example of a visual identity of a brand associated with the user; responsive to the first language model outputting a prediction that the user intended to generate personalized content using a brand kit, generating a brand kit associated with the user; generating intermediate content based on the natural language prompt by generating a plurality of first model-specific prompts using a prompt construction layer, each model-specific prompt of the first model-specific prompts being provided as an input to a respective generative model of a plurality of generative models associated with the designer application to cause the respective generative model to generate at least one aspect of the intermediate content; and customizing the intermediate content to create personalized content based on the brand kit by generating a plurality of second model-specific prompts using a second prompt construction layer, each model-specific prompt of the second model-specific prompts being provided as an input to a respective generative model of the plurality of generative models to cause the respective generative model to generate at least one aspect of the personalized content based on the brand kit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2B is a diagram showing an example process for generating a brand kit according to the techniques disclosed herein.

DETAILED DESCRIPTION

Systems and methods for automatically generating and applying automatic branding are described herein. These techniques utilize prompt adaptation for prompts to large language models (LLM) and visual language models to provide a technical solution to the technical problem of automatically creating content and customizing the content using a personalized brand kit to create personalized content. A personalized brand kit includes preferred fonts, color palettes, logos, images, layout templates, and/or other assets that representative of the visual identity of the brand. These assets are used to generate personalized content based on natural language prompts that request that content be created and/or modified using one or more generative models. The assets of the brand kit are provided to generative models to guide the models in automatically generating new content and/or modifying the attributes of existing content to provide a design that is representative of the visual identity of the brand.

The techniques herein can be implemented in a design application. The design application provides a user interface for receiving natural language prompts from users that request that content be created and/or modified using one or more generative models. The natural language prompts are analyzed by a prompt construction layer that determines user intent and construct prompts for one or more generative models based on the user intent. The prompt construction layer detects when the user intends to apply branding to the design content being generated based on the natural language prompt. The prompt construction layer determines whether the user is associated with an existing brand kit and automatically applies the brand kit to the content generated in response to the natural language prompt. The prompt construction layer automatically generates a brand kit for the user if the user is not already associated with a brand kit and automatically applies the brand kit to the content generated in response to the natural language prompt. A technical benefit of this approach is that the prompt construction layer utilizes a language model to generate prompts for the various generative models used to create or customize content. Consequently, the generative models do not have to be retrained or fine-tuned to support the creation of brand kits and the application of brand kits to the content generated by the generative models. Retraining and/or fine-tuning models requires extensive amount of time, human and computing resources. These and other technical benefits of the techniques disclosed herein will be evident from the discussion of the example implementations that follow.

Figure 1:
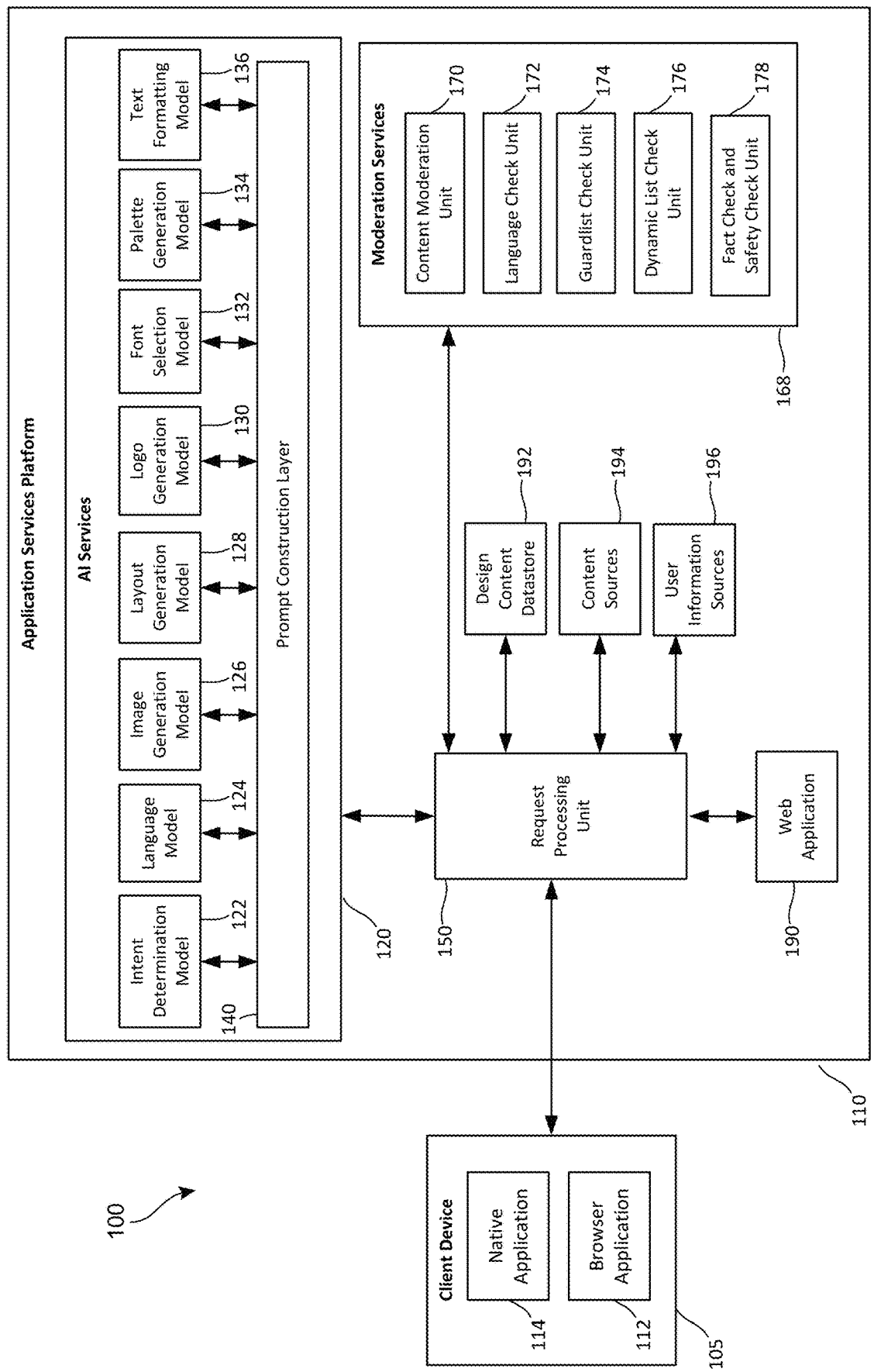
FIG. 1 is a diagram of an example computing environment in which the techniques for automatically generating personalized content described herein are implemented.

FIG. 1 is a diagram of an example computing environment 100 in which the techniques described herein are implemented. The example computing environment 100 includes a client device 105 and an application services platform 110. The application services platform 110 provides one or more cloud-based applications and/or provides services to support one or more web-enabled native applications on the client device 105. These applications may include but are not limited to design applications, communications platforms, visualization tools, and collaboration tools for collaboratively creating visual representations of information, and other applications for consuming and/or creating electronic content. The client device 105 and the application services platform 110 communicate with each other over a network (not shown). The network may be a combination of one or more public and/or private networks and may be implemented at least in part by the Internet.

The application services platform 110 includes a request processing unit 150, artificial intelligence (AI) services 120, moderation services 168, a web application 190, a design content datastore 192, content source 194, and user information sources 196. The request processing unit 150 is configured to receive requests from a design application implemented by the native application 114 of the client device 105 and/or the web application 190 of the application services platform 110. The requests may include but are not limited to requests to generate a new design, to customize an existing design according to a brand kit, and/or create a brand kit as discussed in the examples which follow. A design, as used herein, refers to electronic content, such as but not limited to web pages, blogs, social media posts, invitations, graphics, posters, and/or advertisements. The design can include textual content, images, and/or illustrations, and the design application can use artificial intelligence (AI) to assist with the creation and/or customization of this content. The design application also utilizes AI to assist with the creation of brand kits comprising a set of electronic assets providing example of a visual identity of a brand associated with the user and the application of the brand kit to customize content for designs. In some implementations, the web application 190 of the application services platform 110 implements this functionality of the design application. In other implementations, at least a portion of this functionality is implemented by the native application 114 of the client device 105. The request processing unit 150 also coordinates communication and exchange of data among components of the application services platform 110 as discussed in the examples which follow.

Figure 3A:
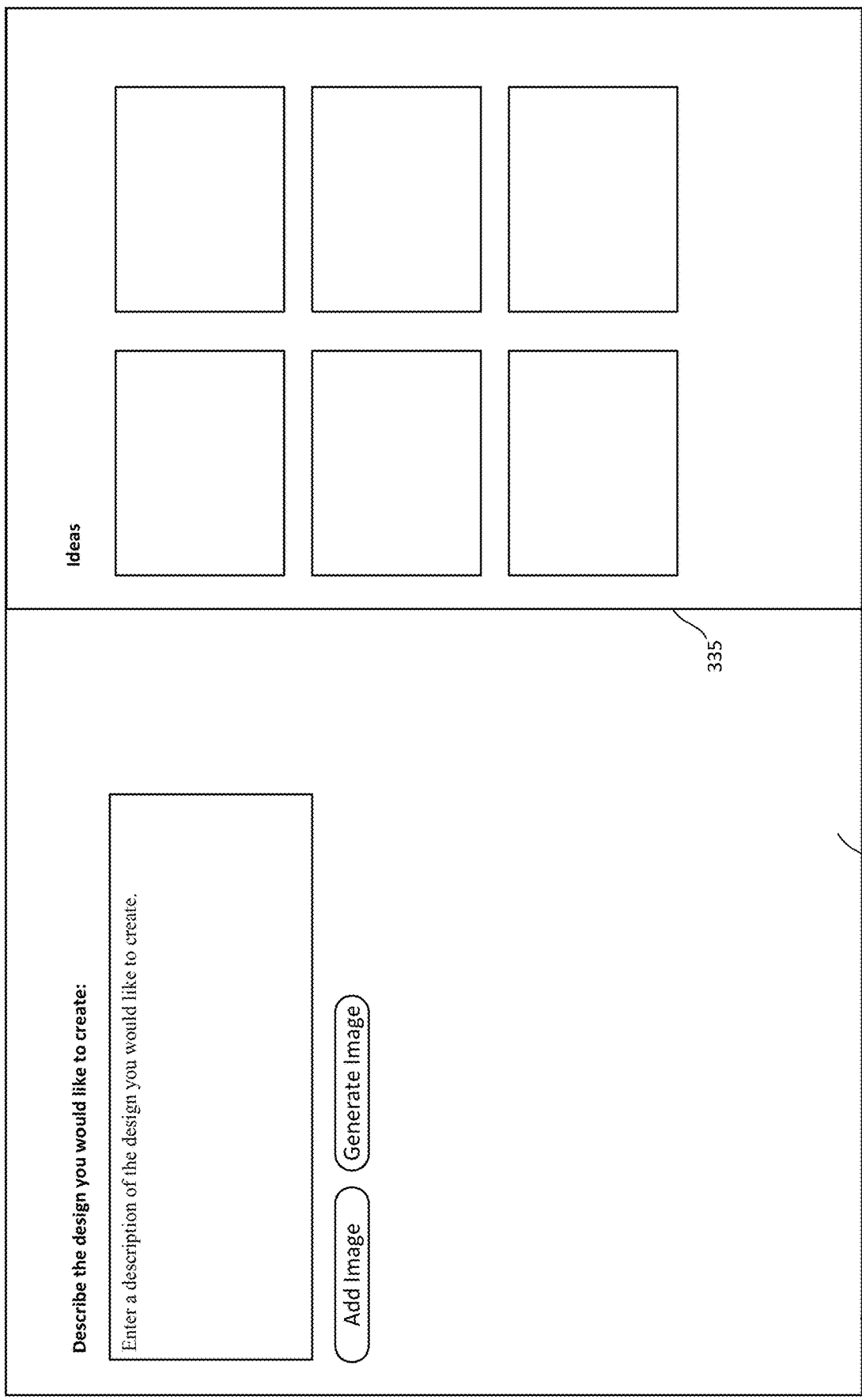
FIGS. 3A-3H are diagrams showing an example user interface of a design application according to the techniques disclosed herein.
Figure 3B:
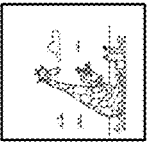
Figure 3C:
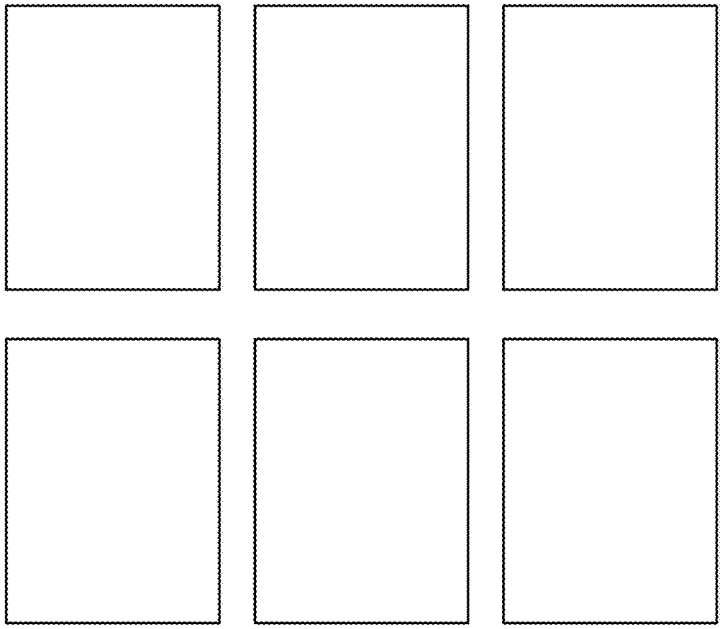
Figure 3D:
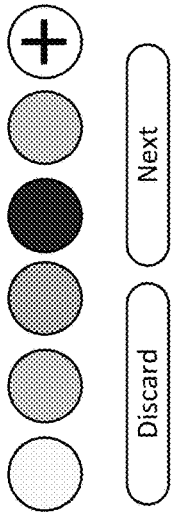
Figure 3E:
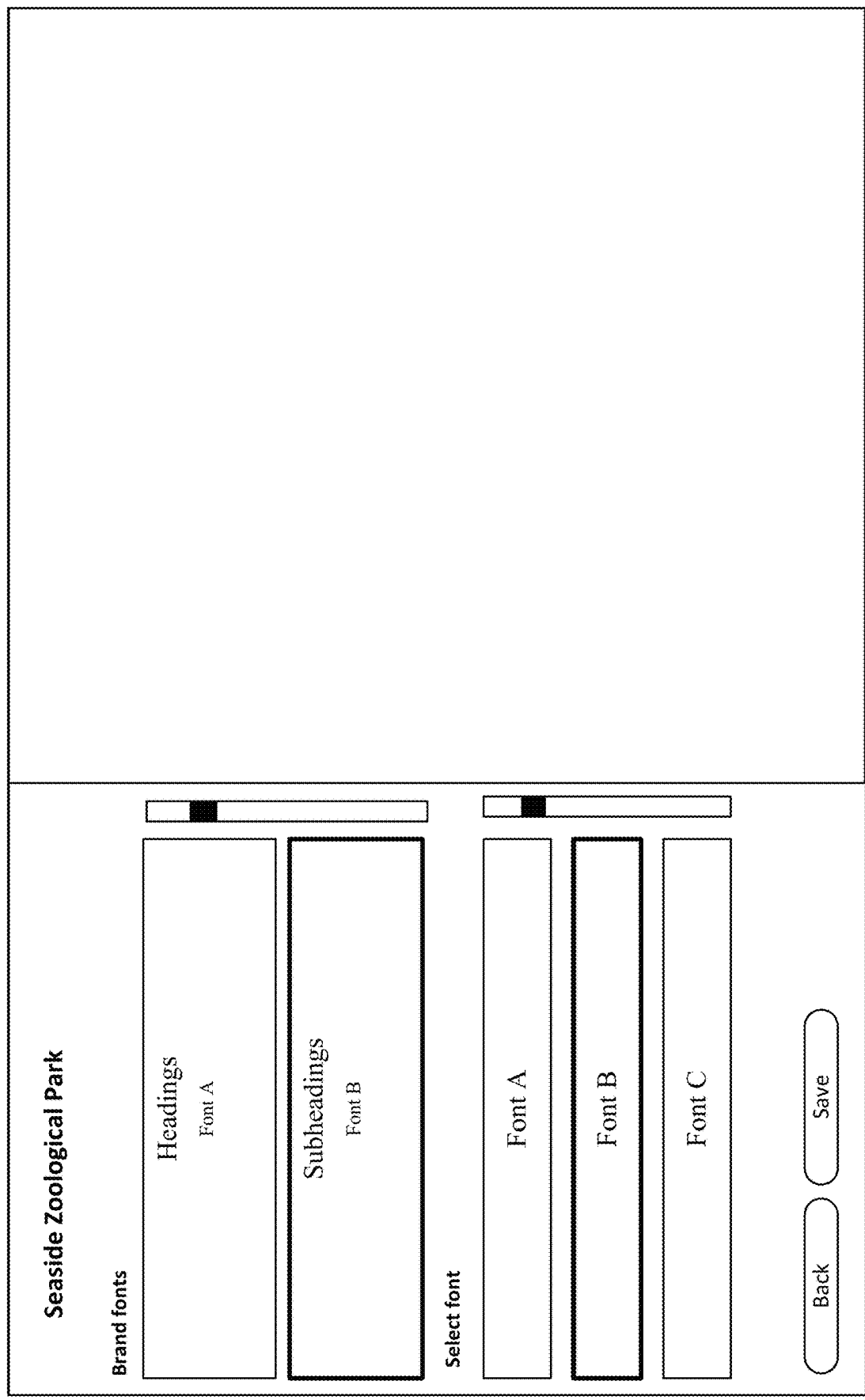

The design content datastore 192 is a persistent datastore in the memory of the application services platform 110 that stores information associated with designs created with and/or modified using the design application. The design content datastore 192 stores brand kit information for users, enterprises, and/or other organizations. Users may have personal brand kits for designs created on behalf of themselves. An enterprise or other organization may also create brand kits that enable designers to create content that is consistent with the brand identity of the enterprise or organization. The brand kits may include logos, templates for laying out content, preferred font information, and/or graphics that may be integrated into the content created using the design application. The brand kits may also include additional information associated with the brand, such as but not limited the target audience, product features, sales style, and brand-specific fact checks and/or safety principles. FIGS. 3D and 3E show an example user interface that is implemented by the native application 114 of the client device and/or the web application 190 of the application services platform 110. The organization-specific brand kits and/or enterprise-specific brand kits stored in the design content datastore 192 and are available to users on a specified domain. Users who have access to the organization-specific brand kits and/or enterprise-specific brand kits may utilize these brand kits or may modify a copy of the brand kits.

The content sources 194 provide sample content that can be included in the designs created using the design application. The sample content can include imagery, illustrations, samples of textual content, samples of layouts of various types of designs, and/or other content that may be included in a design. The sample imagery can also be provided as an input with a natural language prompt to provide additional context to the prompt construction layer 140 for generating content for a design. The content sources 194 may include a persistent datastore in the memory of the application services platform 110 that stores the sample content. The content sources 194 may also include web-based content that is accessible by the application services platform 110. The sample content included in a design can be customized according to a brand kit as discussed in greater detail in the examples which follow.

The user information sources 196 is a persistent datastore in the memory of the application services platform 110 that stores information associated with users of the design application that can be used in generating personal brand kits and/or generating enterprise-specific or organization-specific brand kits. In some implementations, the user information sources 196 is implemented at least in part by the Microsoft Graph® platform or other similar platforms which implements graphs associated with the user. The Microsoft Graph® platform provides an application programming interface (API) that enables the request processing unit 150, the prompt construction layer 140, and/or other components of the application services platform 110 to query the data included in the graph associated with the user. The graph includes content associated with various cloud-based services that has been authored by and/or modified by the user, such as but not limited to Microsoft Word® Microsoft Teams®, Microsoft OneDrive®, Microsoft Outlook®, and/or other cloud-based services. The graph may include enterprise-specific information associated with the user, projects associated with the enterprise, project teams within the enterprise, and/or the technologies implemented by the enterprise, such as enterprise-specific terminology, acronyms, project names, and/or other terminology that may be utilized in the sample content items authored by the user. A technical benefit of this approach is that content created by the user can be accessed and analyzed by the AI services 120 when generating a brand kit for the user. Another technical benefit of this approach is that the information indicating that the user is associated with a particular enterprise or organization can be obtained from the graph and used to look up whether the enterprise or organization has a brand kit stored in the design content datastore 192. Other content sources can also be utilized, such as but not limited to social media posts, email messages, and/or other sources of content generated by the user may also be accessed by the request processing unit 150, the prompt construction layer 140, and/or other components of the application services platform 110.

The AI services 120 include intent determination model 122, language model 124, image generation model 126, layout generation model 128, logo generation model 130, font selection model 132, palette generation model 134, text formatting model 136. The intent determination model 122 is a language model trained to analyze a natural language prompt input by a user into a design application implemented by the native application 114 or the web application 190 and to output a prediction whether the user intended to generate personalized content using a brand kit comprising a set of electronic assets providing example of a visual identity of a brand associated with the user.

The language model 124 is a machine learning model trained to generate textual content in response to natural language prompts input by a user via the native application 114 or via the browser application 112. The language model 124 is implemented using a large language model (LLM) in some implementations. Examples of such models include but are not limited to a Generative Pre-trained Transformer 3 (GPT-3), or GPT-4 model. Other implementations may utilize other models or other generative models to generate textual content in response to user prompts. The language model 124 is used to generate content to be included in designs created using the design application implemented by the application services platform 110. The language model 124 is also used to generate prompts to other generative models of the AI services 120 to cause the models to generate and/or customize various aspects of a design according to a brand kit as discussed in the examples which follow.

The image generation model 126 is a generative model configured to generate images based on textual prompts describing the imagery to be generated, sample images, or a combination thereof. The image generation model 126 can modify the color palette and/or other attributes of the sample images based on the textual prompt. The image generation model 126 can be used to modify attributes of the sample images based on a brand kit as discussed in the examples which follow. The image generation model 126 is configured to retrieve imagery from the content sources 194 and/or other content sources in some implementations based on the brand-specific color palette and styles. The image generation model 126 can generate imagery based on the brand-specific color palette and styles and the natural language prompt in some implementations.

The layout generation model 128 is a generative model that is trained to generate a layout for various types of content being created and/or modified in the design application provided by the application services platform 110. The layout generation model 128 is configured to receive a natural language prompt input by the user describing content to be created and content items to be included in the layout generated by the layout generation model 128. These content items can include textual context, images, illustrates, video, animations, and/or other types of content items that may be included in the content item. In some implementations, the layout generation model 128 is trained to select from among predetermined templates to generate a layout for a content item. In other implementations, the layout generation model 128 is trained to generate novel layouts for content items based on the natural language prompt.

The logo generation model 130 is a generative model that is trained to generate a logo for a user that can be included in a brand kit. The logo can be generated based on the natural language prompt and additional information associated with the user. The additional information associated with the user may include information indicating an enterprise or other organization associated with the user.

The font selection model 132 is a language model that provides font recommendations that may be included in a brand kit. The fonts can be selected from among a set of fonts supported by the design application provided by the application services platform 110. The fonts can be selected based on the natural language prompt and additional information associated with the user, as discussed above.

The palette generation model 134 is a generative model trained to generate a color palette comprising a set of colors that may be included in a brand kit. The palette generation model 134 selects colors based on the natural language prompt and additional information associated with the user, as discussed above. The color palette output by the palette generation model 134 can be provided as an input to the image generation model 126 along with an image to be customized according to the color palette, and the image generation model 126 outputs a customized version of the image in which the image has been updated according to the color palette.

The text formatting model 136 is configured to format textual content associated with a design. The text formatting model 136 receives a current version of a design in which the textual content is to be formatted. The text formatting model 136 can also receive the natural language prompt and brand kit information as an input. The text formatting model 136 customizes the fonts, font sizes, tone of the text, font colors, and/or other features of the textual content included in the design and outputs the customized design.

The prompt construction layer 140 implements prompt adaptation for prompts to LLMs, visual language models, and/or other types of generative models implemented by the AI services 120 to provide a technical solution to the technical problem of automatically creating content and customizing the content using a brand kit to create personalized content. The prompt construction layer 140 receives natural language prompts input by users of the design application implemented by the native application 114 and/ or the web application 190. The prompt construction layer 140 is configured to provide a prompt or set of prompts to the language model 124 to cause the language model 124 to generate model-specific prompts for the intent determination model 122, the image generation model 126, the layout generation model 128, the logo generation model 130, the font selection model 132, the palette generation model 134, and/or the text formatting model 136. The prompt construction layer 140 generates prompts to these models in response to natural language prompt to generate a design in the design application. The prompt construction layer 140 generates the model-specific prompts using the language model 124. The prompt construction layer 140 provides a prompt to the language model 124 requesting that the language model 124 generate the model-specific prompt for a specific model of the AI services 120. In some implementations, the prompt construction layer 140 accesses a model-specific prompt template for each of the models of the AI services 120 from the design content datastore 192 and provides the model-specific prompt template as part of the prompt to the language model 124 to generate a model-specific prompt. A technical benefit of this approach is that the prompt construction layer 140 and the language model 124 generate the model-specific prompts to perform specific actions such as generating content for a design and/or customizing the content on the design, and the underling models of the AI services 120 do not need to be retrained or fine-tuned to perform the generation and/or customization tasks used to produce designs customized according to a particular brand kit. Additional details of the prompt construction layer 140 are discussed in greater detail in the examples which follow.

The moderation services 168 analyze natural language prompts input by the user in the design application implemented by the native application 114 and/or the web application 190 and content generated by the language model 124 and/or other models of the AI services 120 to ensure that potentially objectionable or offensive content is not generated or utilized by the application services platform 110. If potentially objectionable or offensive content is detected, the moderation services 168 provides a blocked content notification to the client device 105 indicating that the natural language prompt and/or the content generated by the AI services 120 in response to the natural language prompt included content that is blocked.

The moderation services 168 performs several types of checks on the natural language prompts entered by the user in the native application 114 or the web application 190 and/or content generated by the language model 124 and/or other models of the AI services 120. The content moderation unit 170 is implemented by a machine learning model trained to analyze the textual content of these various inputs to perform a semantic analysis on the textual content to predict whether the content includes potentially objectionable or offensive content. The language check unit 172 performs another check on the textual content using a second model configured to analyze the words and/or phrase used in textual content to identify potentially offensive language. The guard list check unit 174 is configured to compare the language used in the textual content with a list of prohibited terms including known offensive words and/or phrases. The dynamic list check unit 176 provides a dynamic list that can be quickly updated by administrators to add additional prohibited words and/or phrases. The dynamic list may be updated to address problems such as words or phrases becoming offensive that were not previously deemed to be offensive. The words and/or phrases added to the dynamic list may be periodically migrated to the guard list as the guard list is updated. The specific checks performed by the moderation services 168 may vary from implementation to implementation. If one or more of these checks determines that the textual content includes offensive content, the moderation services 168 can notify the application services platform 110 that some action should be taken.

The fact checking unit 178 analyzes factual statements made in in the intermediate content and/or personalized design content automatically generated according to the techniques herein. The fact check and safety check unit 178 implements an automated fact check that verifies assertions made in the generated content. If the fact check and safety check unit 178 identifies any assertions that cannot be verified or are predicted to be factually inaccurate, the fact check and safety check unit 178 identifies these assertions and can prompt the user to update the design to remove or correct these assertions.

In some implementations, the moderation services 168 generates a blocked content notification, which is provided to the client device 105. The native application 114 or the web application 190 receives the notification and presents a message on a user interface of the design application or other application that submitted the natural language prompt which could not be processed. The user interface provides information indicating why the blocked content notification was issued in some implementations. The user may attempt to refine the natural language prompt to remove the potentially offensive content. A technical benefit of this approach is that the moderation services 168 provides safeguards against both user-created and model-created content to ensure that prohibited offensive or potentially offensive content is not presented to the user in the native application 114 or the web application 190.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

The client device 105 includes a native application 114 and a browser application 112. The native application 114 is a web-enabled native application, in some implementations, implements a design application as discussed above. The browser application 112 can be used for accessing and viewing web-based content provided by the application services platform 110. In such implementations, the application services platform 110 implements one or more web applications, such as the web application 190, that enables users to create content, create brand kits, and apply the brand kit to content create personalized content. The application services platform 110 supports both the native application 114 and a web application 190 in some implementations, and the users may choose which approach best suits their needs.

Figure 2A:
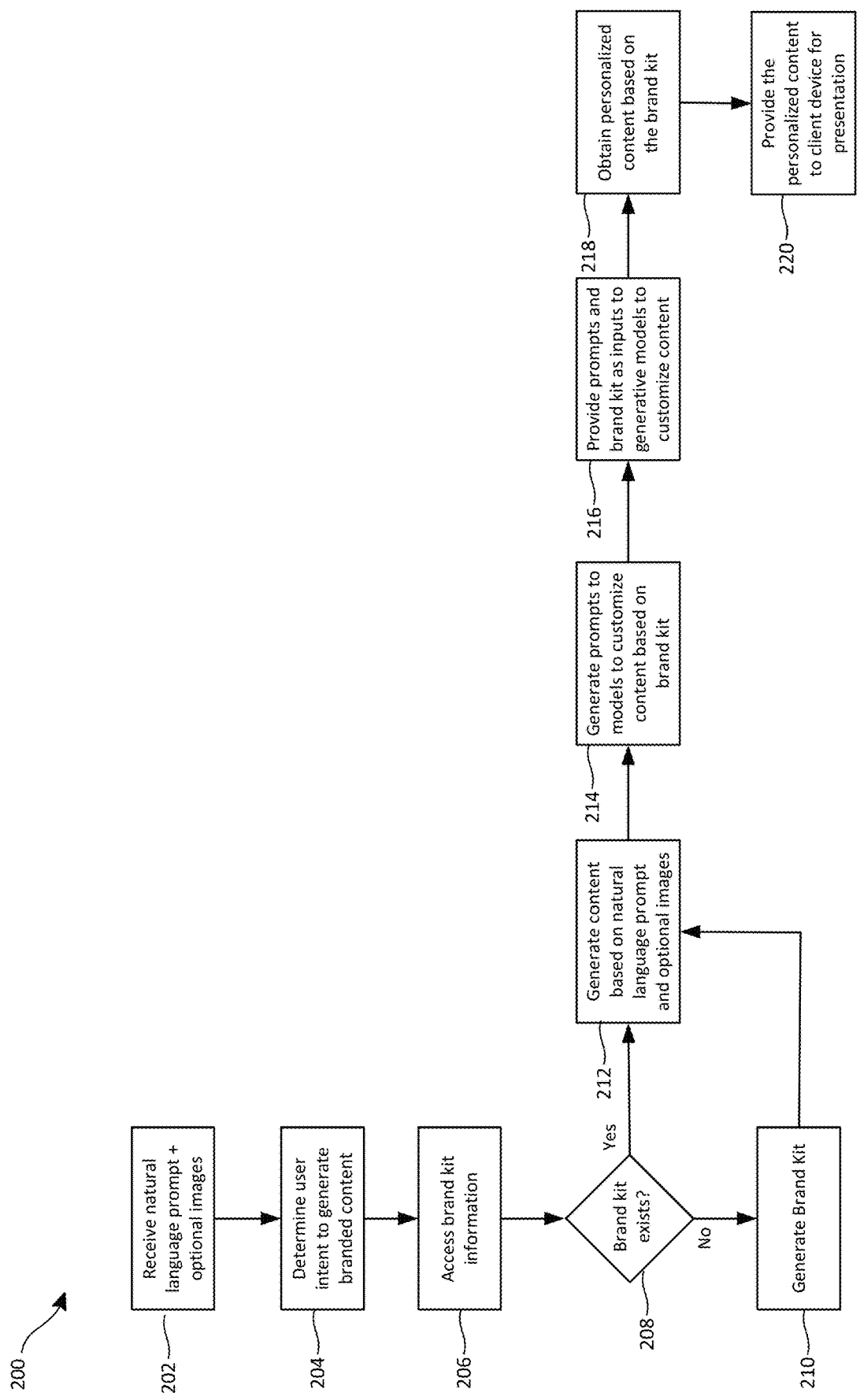
FIG. 2A is a diagram showing an example process for generating personalized content according to the techniques disclosed herein.

FIG. 2A is a diagram showing an example process 200 for generating personalized content according to the techniques disclosed herein. The process 200 can be implemented by the application services platform 110 shown in the preceding examples. The process shown in FIG. 2A shows aspects of the technical solution to the technical problem automatically creating content and customizing the content using a brand kit to create personalized content provided herein.

The process 200 includes an operation 202 of receiving a natural language prompt and one or more optional sample images. The natural language prompt and one or more optional samples images are input by the user via a user interface of a design application implemented by the native application 114 or the web application 190. An example of such a user interface is shown in FIGS. 3A-3C.

The process 200 includes an operation 204 of determining user intent to generate branded content. The application services platform 110 determines whether the user intended to apply a brand kit to the content generated in response to the natural language prompt. The prompt construction layer 140 provides the natural language prompt to the intent determination model 122 to obtain a prediction whether the user intended to apply a brand kit to the generated content.

The process 200 includes an operation 206 of accessing brand kit information. The prompt construction layer 140 can request the brand kit information from the request processing unit 150. The request processing unit 150 obtain the brand kit associated with the user from the design content datastore 192. If no brand kit exits for the user, the user may be associated with an enterprise or other organization that has a brand kit. The request processing unit 150 accesses the user information sources 196 to obtain information indication whether the user is associated with an enterprise or other organization and checks for a brand kit associated with the enterprise or organization. In some implementations, the intent determination model 122 determines whether the user intends to utilize a persona brand kit or an enterprise-specific or organization-specific brand kit. This determination may be based at least in part on the natural language prompt and the user information obtained from the user information sources 196. If the natural language prompt is indicative of the user creating personal content, the personal brand kit is used, If the natural language prompt is indicative of work-related or other professional content being created, the enterprise-specific or organization-specific brand kit is used.

The process 200 includes an operation 206 of determining whether a brand kit associated with the user exists and an operation 210 of generating a brand kit for the user responsive to determining that no brand kit associated with the user exists. If no brand kit exists for the user, the prompt construction layer 140 can automatically generate a new brand kit. FIG. 2B provides an example of a process that can be used to implement generating the brand kit.

The process 200 includes an operation 212 of generating intermediate content based on the natural language prompt and the one or more optional sample images. The prompt construction layer 140 initially generates model-specific prompts to the generative models to generate intermediate content according to the natural language prompt and any optional sample images that were provided with the natural language prompt. As discussed in the preceding examples, the prompt construction layer 140 utilizes the language model 124 to generate model-specific prompts for one or more of the generative models of the AI services 120 to generate the intermediate content for a design based on the natural language prompt. The intermediate content is content that is generated according to the natural language prompt and/or the sample images but has not yet had the branding of the brand kit applied to the content. Thus, the color palette, layout, fonts, logo, and/or other aspects of the intermediate content may differ from the branding associated with the brand kit.

The process 200 includes an operation 214 of generating model-specific prompts to the generative models to customize the intermediate content based on the brand kit, an operation 216 of providing the model-specific prompts to the generative models of the AI services 120, and an operation 218 of generating personalized content based on the brand kit. As discussed in the preceding examples, the prompt construction layer 140 utilizes the language model 124 to generate model-specific prompts for one or more of the generative models of the AI services 120 to generate the personalized content from the intermediate content by applying the brand kit to the intermediate content. The color palette, layout, fonts, logo, and/or other aspects of the intermediate content may be updated to match those of the brand kit.

Figure 3F:
Figure 3G:
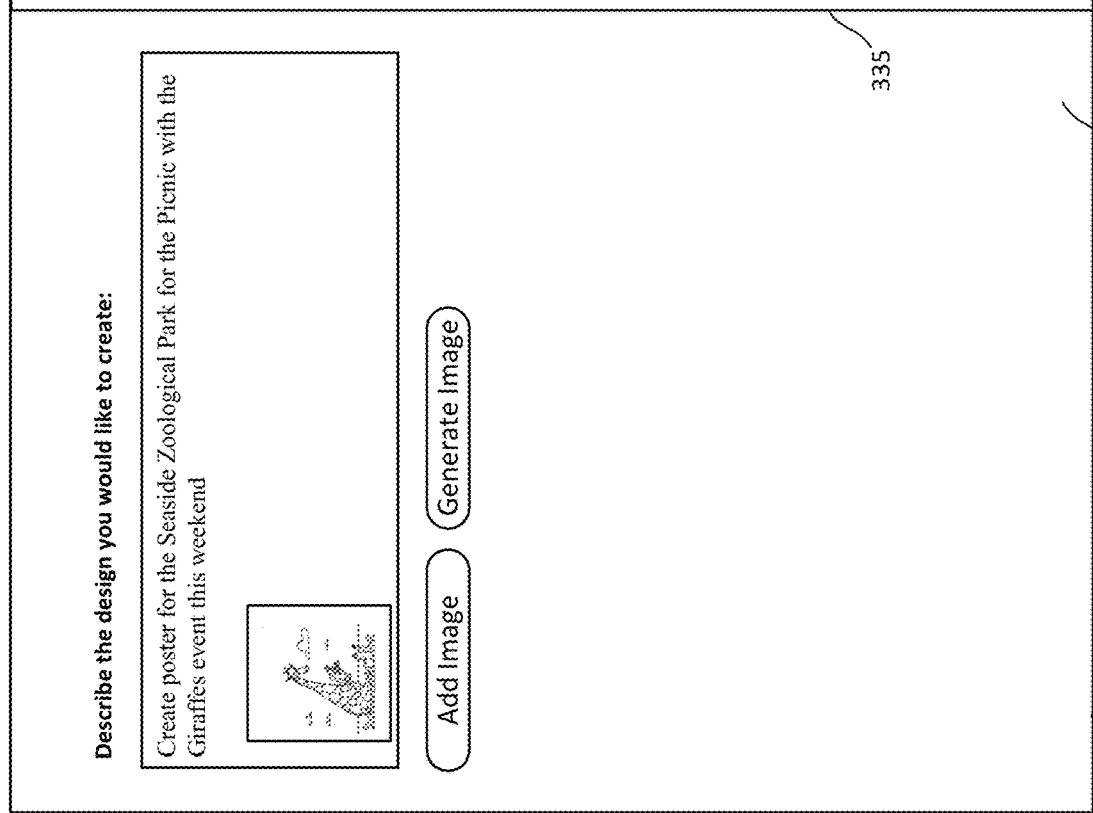
Figure 3H:

The process 200 includes an operation 220 of providing the personalized content to the client device 105 of the user and causing the client device 105 to present the personalized content on a user interface of the client device 105. The native application 114 or the web application 190 can present the personalized content on the user interface 305 of the design application as shown in FIG. 3G. If a brand kit was automatically created for the user, the brand kit can also be presented to the user as shown in FIG. 3H.

FIG. 2B is a diagram showing an example process 270 for generating a brand kit according to the techniques disclosed herein. The process 270 can be implemented by the application services platform 110 shown in the preceding examples. The process 270 can be used to implement, at least in part, operation 214 of the process 200 shown in FIG. 2A. The process shown in FIG. 2B shows aspects of the functionality of the prompt construction layer 140 implements prompt adaptation for prompts to LLMs, visual language models, and/or other types of generative models implemented by the AI services 120 to provide a technical solution to the technical problem of automatically creating content and customizing the content using a brand kit to create personalized content.

The process 270 includes an operation 272 of analyzing the natural language prompt and the one or more optional images for attributes. The natural language prompt can be provided to the language model 124 to extract attributes, such as colors, themes, styles, and/or other such attributes specified in the natural language prompt. Analyzing any sample images included with the natural language prompt to extract color information, themes, styles, and/or other such attributes from the sample images.

The process 270 includes an operation 274 of accessing user-related information, enterprise-related information, or both. The information may be retrieved from the user information sources 196. The organization-specific and/or enterprise specific information may include target audience information, product feature information, and/or sales style information.

The process 270 includes an operation 276 of generating brand kit attributes for the brand kit. The prompt construction layer 140 utilizes the information collected in operations 272 and 274 to generate the brand kit. The prompt construction layer 140 generates model-specific prompts to one or more of the generative models of the AI services 120 to generate various attributes of the brand kit, such as but not limited to preferred fonts, color palette, and/or logo. Other attributes may also be determined. The model-specific prompts can include a prompt for the palette generation model 134 to generate a color palette for the brand kit. The model-specific prompts can include a prompt for the font selection model 132 for generating a set of preferred fonts for the brand kit. The model-specific prompts can include a prompt for the logo module to generate a logo for the brand kit. Other model-specific prompts can be generated in addition to or instead of these one or more of these example prompts. As discussed in the preceding examples, the user may modify the attributes of the brand kit that is automatically generated.

The process 270 includes an operation 278 of storing the brand kit information for the brand kit in the design content datastore 192. The prompt construction layer 140 provides the brand hit information to the request processing unit 150. The request processing unit 150 stores the brand kit information in the design content datastore 192.

The process 270 includes an operation 280 of presenting the brand kit to the user. The operation 280 is optional. In some implementations, the request processing unit 150 causes provides the brand kit to the native application 114 of the client device 105 or the web application 190 of the application services platform 110. FIGS. 3F and 3H provide examples of a user interface in which the brand kit is presented to the user. The user may modify the brand kit that has been automatically generated to further customize the brand kit to better represent their brand.

The process 270 includes an operation 282 of receiving user modifications to the brand kit. The user may modify various attributes of the brand kit, such as but not limited to the fonts, color palette, and/or logo. FIGS. 3D and 3E, discussed in detail below, provide an example of a user interface that enables the user to edit the attributes of a brand kit.

The process 270 includes an operation 284 of updating the brand kit information in the design content datastore 192. Any modifications made to the brand kit by the user are made to the brand kit information in the design content datastore 192 and the process 270 returns to operation 278 in which the updated brand kit information is stored in the design content datastore 192.

FIGS. 3A-3H are diagrams showing an example user interface 305 of a design application according to the techniques disclosed herein. The user interface can be implemented by the native application 114 of the client device or the web application 190 of the application services platform 110.

FIG. 3A shows an example of the user interface 305 which includes a query pane 315 and a results pane 335. The query pane 315 includes a prompt field in which the user can enter a natural language prompt describing a design that the user would like to have generated automatically. The prompt can include a detailed description of the colors, fonts, images, content type, and/or other details of the design to be generated. The user can also include one or more samples images that provide context to the generative models that create one or more aspects of the design. The user can click on or otherwise activate the "add image" button to cause the design application to present a file selector interface that enables the user to select one or more preexisting image files. The user can click on or otherwise activate the "generate image" button to cause the design application to present a secondary prompt interface that enables the user to provide a natural language prompt describing an image to be generated by a generative image model. The results pane 335 shows examples of generated content that includes multiple variations of generated content generated by the generative models of the AI services 120. The prompt construction layer 140 of the AI services 120 analyzes the natural language query and generates one or more model-specific prompts to one or more of the generative models of the AI services 120 to cause the generative models to generate various aspects of the design. The prompt construction layer 140 can include the output of one or more of the generative models as an input to another of the generative models along with a model-specific prompt. In a non-limiting example, the prompt construction layer 140 provides an image output by the image generation model 126, text generated by the language model 124, and color palette information obtained from the palette generation model 134 to the layout generation model 128 to layout the design being generated based on the images, text, and/or other assets generated by the other models.

FIG. 3B shows an example of the user interface 305 in which the user has added an image to the natural language query. The prompt construction layer 140 can provide these sample images as an input to one or more of the generative models. In non-limiting example, the sample images may be included in the layout of the design generated by the layout generation model 128, and the palette generation model 134 extracts color information to add to the color palette from the sample images in some implementations.

FIG. 3C shows an example of the user interface 305 in which the user has input a query that expressly indicates that the user would like to create a brand kit. However, as discussed in the preceding examples, the prompt construction layer 140 provides the natural language query input by the user to the intent determination model 122 to obtain a prediction whether the user intends to create a new brand kit and/or apply a brand kit to content generated in response to the natural language query.

FIGS. 3D-3F shows an example of a brand kit pane 325 that is used for creating a new brand kit, modifying an existing brand kit, and/or viewing the details of an existing brand kit. FIGS. 3D and 3E show an example in which the user is being guided through the creation of a brand kit. FIG. 3D shows the that the user can enter a natural language prompt which describes the brand for which the brand kit is being created. The natural language prompt can describe a preferred style, preferred colors, and/or other features of the brand kit. The brand kit pane 325 shows the color palette associated with the brand kit. The color palette can be generated by the palette generation model 134. The color palette may alternatively be manually selected by the user, or the user may manually edit the color palette generated by the palette generation model 134. FIG. 3E show additional aspects of the brand kit pane 325 which provides options for selecting fonts associated with the brand kit. The user may select or otherwise activate the save button to cause the brand kit information to be added to the design content datastore 192 for new brand kits or update the brand kit information in the design content datastore 192. FIG. 3F shows an example of the brand kit pane 325 providing a summary of the brand kit. The user can click on or otherwise activate the "edit brand kit" button to edit the attributes of the brand kit. As discussed in the preceding examples, the brand kit can also be generated automatically for a user, enterprise, or other organization. However, the brand kit pane 325 can be used to view and/or edit the brand kits that have been automatically created. The user interface 305 includes a control or menu item for accessing existing brand kits and for launching the brand kit pane 325. The brand kit pane 325 enables the user to configure other aspects of the brand kits, such as but not limited to logos, templates for laying out content items, and/or other graphics that may be integrated into a design. The brand kit pane 325 may also include additional information associated with the brand, such as target audience information, product feature information, and/or sales style information. The brand kit pane 325 also enables the user to define specific fact-checking and safety principles are performed on the designs generated by the various generative models discussed herein. The fact check and safety check unit 178 of the moderation services 168 verifies that the fact-checking and safety principles associated with the brand kit are satisfied for designs generated by the generative models of the AI services platform 120.

FIG. 3G provides an example of the user interface 305 of a design being presented that has been generated in response to the natural language prompt which includes a sample image. In this example, the sample image provided by the user has been integrated into the design. However, the sample image may be used to provide contextual information, such as example colors, fonts, and/or image style in some implementations, and the sample image is not directly incorporated into the design. While the example shown in FIG. 3G includes a single example design, the application services platform 110 may generate multiple sample designs and present those designs in the results pane 335. For example, the multiple sample designs may be presented in an array similar that shown in FIGS. 3A-3C. FIG. 3H provides another example of the user interface 305 in which a brand kit has also been automatically created based on the natural language prompt. The brand kit is presented along with the sample design generated in response to the natural language query.

Figure 4:
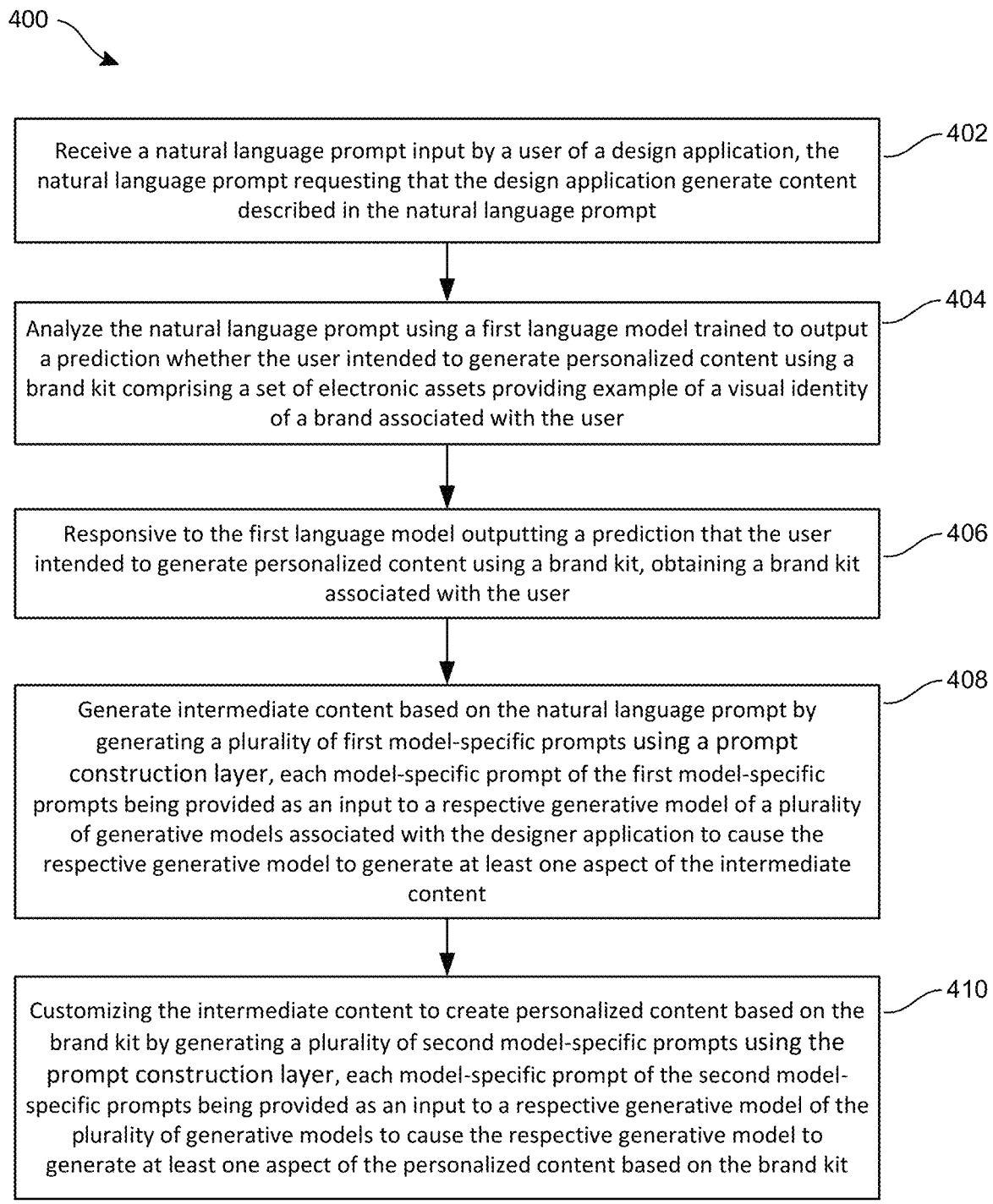
FIG. 4 is a flow chart of another example process for automatically generating personalized content according to the techniques disclosed herein.

FIG. 4 is a flow chart of another example process 400 for automatically generating personalized content according to the techniques disclosed herein. The process 400 can be implemented by the application services platform 110 as discussed in the preceding examples.

The process 400 includes an operation 402 of receiving a natural language prompt input by a user of a design application. The natural language prompt requests that the design application generate content described in the natural language prompt. As discussed in the preceding examples, the natural language prompt and one or more optional sample images may be provided by the user via the user interface 305 of the native application 114 or the web application 190. The request processing unit 150 receives the natural language prompt and/or the one or more sample images and provides these inputs to the prompt construction layer 140.

The process 400 includes an operation 404 of analyzing the natural language prompt using a first language model trained to output a prediction whether the user intended to generate personalized content using a brand kit comprising a set of electronic assets providing example of a visual identity of a brand associated with the user. The prompt construction layer 140 provides the natural language prompt to the intent determination model 122, and the intent determination model 122 outputs a prediction whether the user intended to apply a brand kit to the content to be generated.

The process 400 includes an operation 406 of responsive to the first language model outputting a prediction that the user intended to generate personalized content using a brand kit, obtaining a brand kit associated with the user. The request processing unit 150 obtains the brand kit from the design content datastore 192 and provides the brand kit to the prompt construction layer 140. If no brand kit is available, the prompt construction layer 140 can obtain user information, organization information, and/or enterprise information from the user information sources 196 and automatically generate prompts to one or more of the generative models of the AI services 120 to automatically generate the brand kit. Furthermore, the application services platform 110 can guide the user through manually creating the brand kit in some implementations using the interface shown in FIGS. 3D and 3E. Organization-specific brand kits and/or enterprise-specific brand kits are stored in the design content datastore 192 and are available to users on a specified domain.

The process 400 includes an operation 408 of generating intermediate content based on the natural language prompt by generating a plurality of first model-specific prompts.

Each model-specific prompt of the first model-specific prompts is provided as an input to a respective generative model of a plurality of generative models associated with the designer application to cause the respective generative model to generate at least one aspect of the intermediate content. As discussed in the preceding examples, the application services platform 110 first generates intermediate content based on the natural language prompt and any sample images provided as an input by the user. This intermediate content is then customized using the brand kit.

The process 400 includes an operation 410 of customizing the intermediate content to create personalized content based on the brand kit by generating a plurality of second model-specific prompts. Each model-specific prompt of the second model-specific prompts being provided as an input to a respective generative model of the plurality of generative models to cause the respective generative model to generate at least one aspect of the personalized content based on the brand kit. As discussed in the preceding examples, the prompt construction layer 140 generates the model-specific prompts to the generative models of the AI services 120 to customize the intermediate content generated based on the natural language prompt based on the brand kit.

Figure 5:
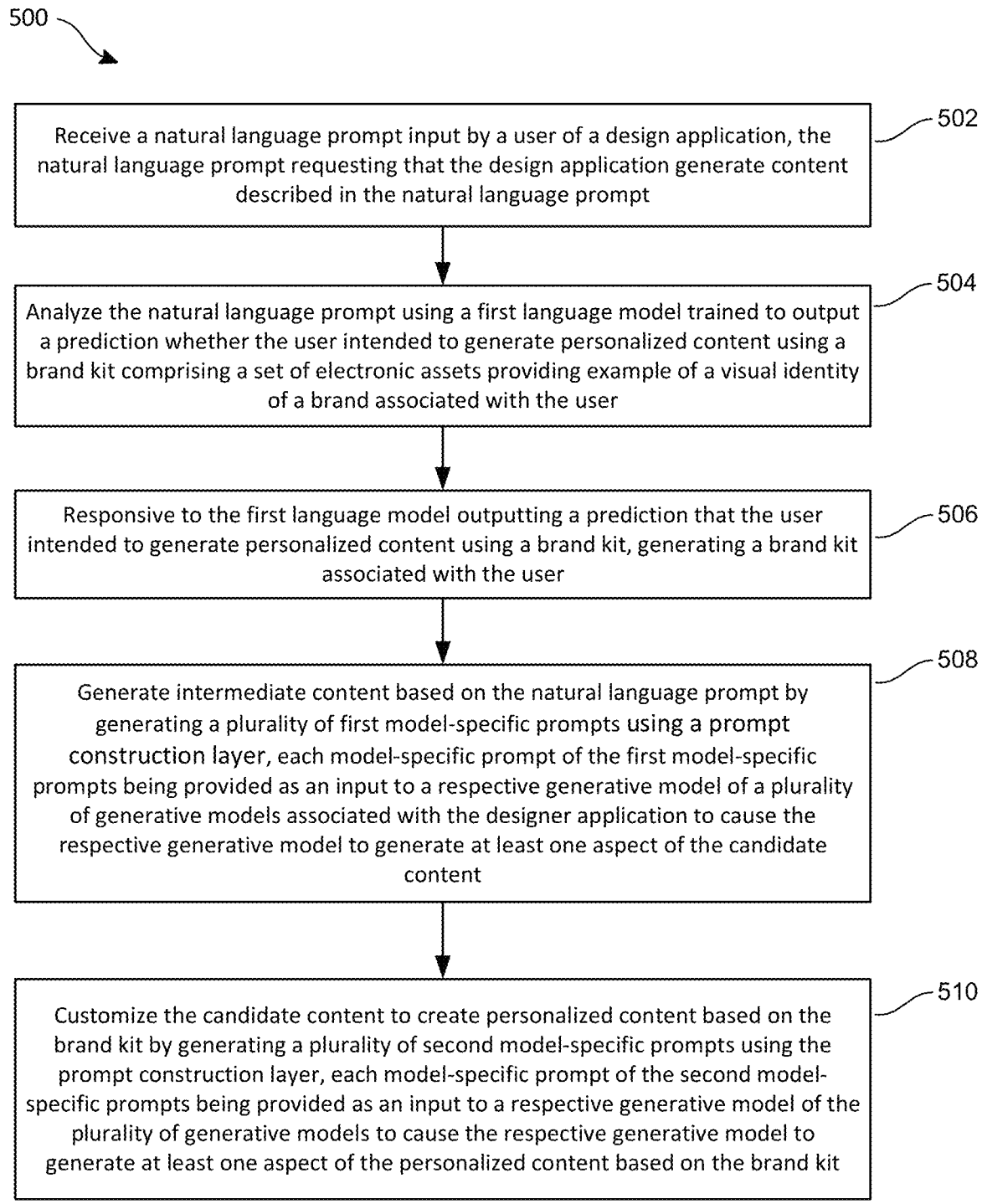
FIG. 5 is a flow chart of another example process for automatically generating personalized content according to the techniques disclosed herein.

FIG. 5 is a flow chart of another example process 500 for automatically generating personalized content according to the techniques disclosed herein. The process 500 can be implemented by the application services platform 110 as discussed in the preceding examples.

The process 500 includes an operation 502 of receiving a natural language prompt input by a user of a design application. The natural language prompt requests that the design application generate content described in the natural language prompt. As discussed in the preceding examples, the natural language prompt and one or more optional sample images may be provided by the user via the user interface 305 of the native application 114 or the web application 190. The request processing unit 150 receives the natural language prompt and/or the one or more sample images and provides these inputs to the prompt construction layer 140.

The process 500 includes an operation 504 of analyzing the natural language prompt using a first language model trained to output a prediction whether the user intended to generate personalized content using a brand kit comprising a set of electronic assets providing example of a visual identity of a brand associated with the user. The prompt construction layer 140 provides the natural language prompt to the intent determination model 122, and the intent determination model 122 outputs a prediction whether the user intended to apply a brand kit to the content to be generated.

The process 500 includes an operation 506 of responsive to the first language model outputting a prediction that the user intended to generate personalized content using a brand kit, generating a brand kit associated with the user. The prompt construction layer 140 can obtain user information, organization information, and/or enterprise information from the user information sources 196 and automatically generate prompts to one or more of the generative models of the AI services 120 to automatically generate the brand kit. Furthermore, the application services platform 110 can guide the user through manually creating the brand kit in some implementations using the interface shown in FIGS. 3D and 3E.

The process 500 includes an operation 508 of generating intermediate content based on the natural language prompt by generating a plurality of first model-specific prompts. Each model-specific prompt of the first model-specific prompts is provided as an input to a respective generative model of a plurality of generative models associated with the designer application to cause the respective generative model to generate at least one aspect of the intermediate content. As discussed in the preceding examples, the application services platform 110 first generates intermediate content based on the natural language prompt and any sample images provided as an input by the user. This intermediate content is then customized using the brand kit.

The process 500 includes an operation 510 of customizing the intermediate content to create personalized content based on the brand kit by generating a plurality of second model-specific prompts. Each model-specific prompt of the second model-specific prompts being provided as an input to a respective generative model of the plurality of generative models to cause the respective generative model to generate at least one aspect of the personalized content based on the brand kit. As discussed in the preceding examples, the prompt construction layer 140 generates the model-specific prompts to the generative models of the AI services 120 to customize the intermediate content generated based on the natural language prompt based on the brand kit.

The detailed examples of systems, devices, and techniques described in connection with FIGS. 1-5 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
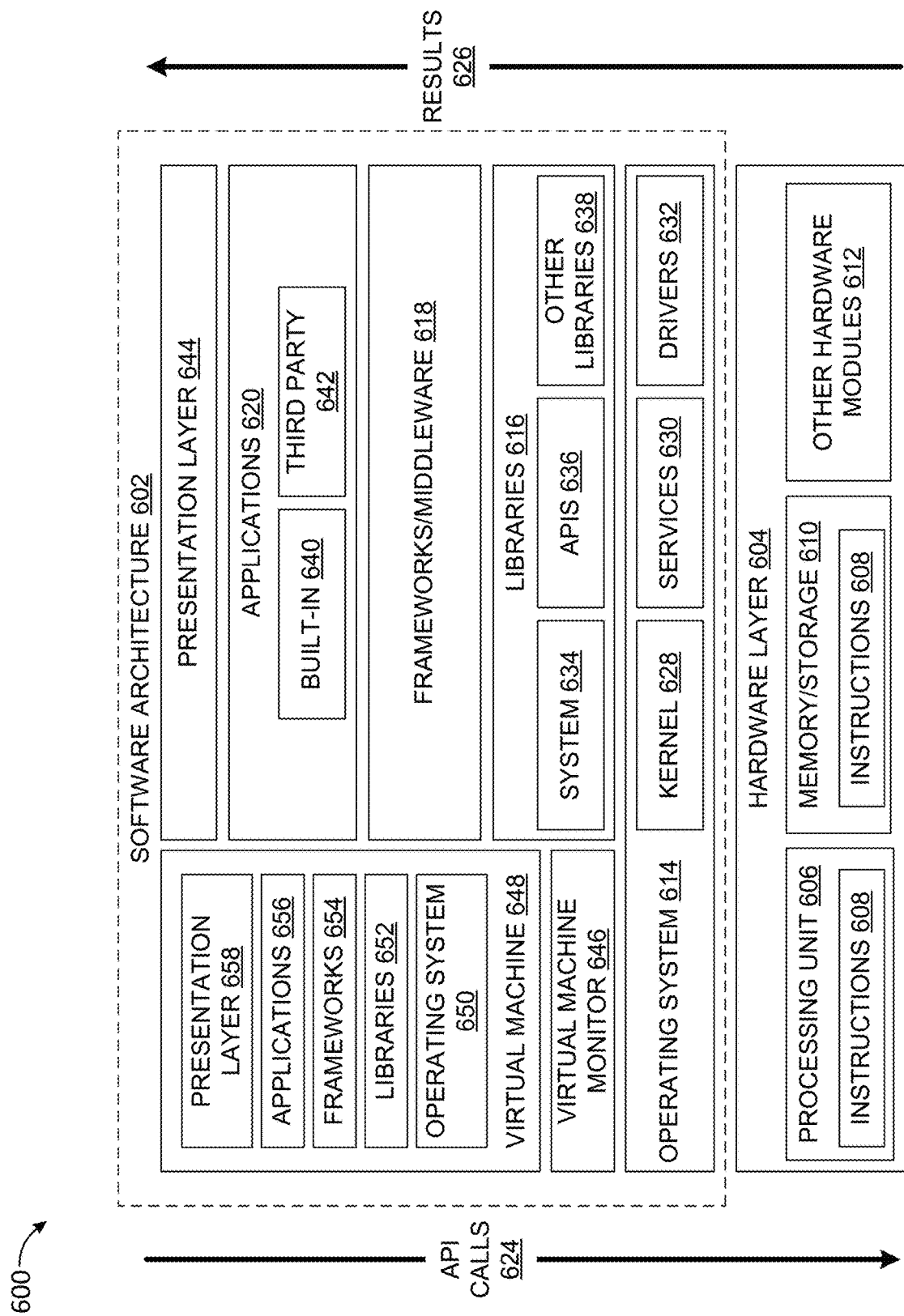
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
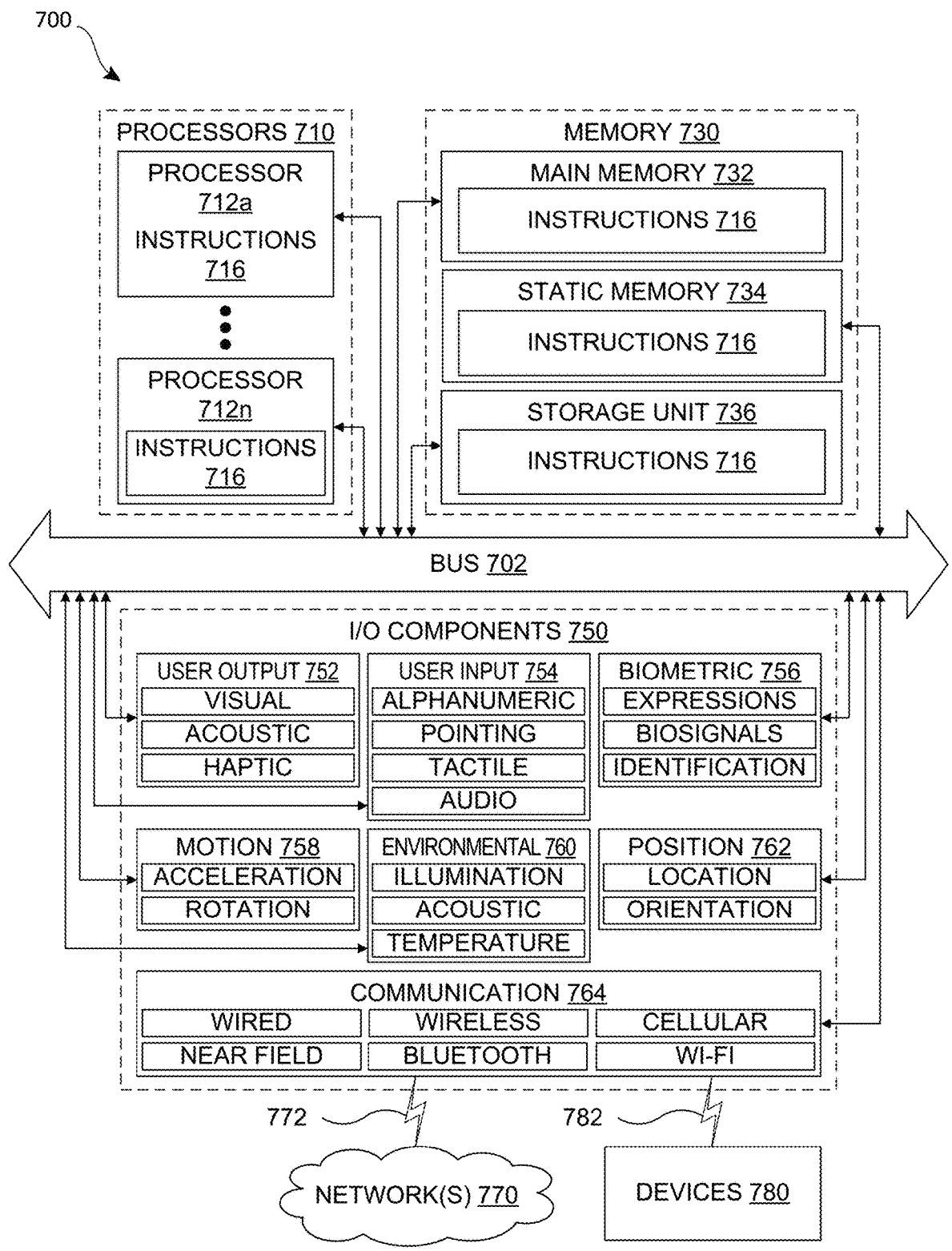
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multicore processor including cores that may execute instructions contemporaneously. Although FIG. 7 shows multiple processors, the machine 700 may include a single processor with a single core, a single processor with multiple cores (for example, a multicore processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782.

The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory storing executable instructions that, when executed, cause the processor alone or in combination with other processors to perform operations of:
   receiving a natural language prompt input by a user of a design application, the natural language prompt requesting that the design application generate content described in the natural language prompt;
   analyzing the natural language prompt using a first language model trained to output a prediction whether the user intended to generate personalized content using a brand kit comprising a set of electronic assets providing example of a visual identity of a brand associated with the user;
   responsive to the first language model outputting a prediction that the user intended to generate personalized content using a brand kit, obtaining a brand kit associated with the user;
   generating intermediate content based on the natural language prompt by generating a plurality of first model-specific prompts using a prompt construction layer, each model-specific prompt of the first model-specific prompts being provided as an input to a respective generative model of a plurality of generative models associated with the designer application to cause the respective generative model to generate at least one aspect of the intermediate content; and
   customizing the intermediate content to create personalized content based on the brand kit by generating a plurality of second model-specific prompts using the prompt construction layer, each model-specific prompt of the second model-specific prompts being provided as an input to a respective generative model of the plurality of generative models to cause the respective generative model to generate at least one aspect of the personalized content based on the brand kit.

2. The data processing system of claim 1, wherein the assets included in the brand kit include one or more of a color palette, one or more fonts, and a logo.

3. The data processing system of claim 1, wherein receiving a natural language prompt input by the user of the design application further comprises receiving a sample image associated with the natural language prompt, and wherein generating the intermediate content based on the natural language prompt further comprises generating the intermediate content based on the natural language prompt and the samples image by generating a plurality of first model-specific prompts based on the natural language prompt and the sample image.

4. The data processing system of claim 1, wherein obtaining the brand kit associated with the user further comprises:
   determining that the user is not associated with a brand kit; and
   generating the brand kit based at least in part on the natural language prompt and information associated with the user.

5. The data processing system of claim 4, wherein generating the brand kit based further comprises generating the brand kit based at least in part on the natural language prompt, the information associated with the user, and one or both of features of a product or service identified in the natural language prompt and a target audience for the product or service.

6. The data processing system of claim 1, wherein obtaining the brand kit associated with the user further comprises:
   determining that the user is associated with an organization that has an organization-specific brand kit; and
   using the organization-specific brand kit as the brand kit.

7. The data processing system of claim 1, wherein the memory further includes instructions configured to cause the processor alone or in combination with other processors to perform operations of:
   performing brand-specific fact checks on the personalized content to identify aspects of the intermediate content which are factually incorrect; and
   correcting the aspects of the intermediate content which are factually incorrect.

8. The data processing system of claim 1, wherein the brand kit includes additional information including one or more of target audience information, sales style information, and product features information.

9. The data processing system of claim 1, wherein the second language model is a large language model (LLM).

10. The data processing system of claim 1, wherein the memory further includes instructions configured to cause the processor alone or in combination with other processors to perform operations of:
    causing the designer application to present the personalized content on a user interface of the designer application.

11. A method implemented in a data processing system for automatically generating personalized content, the method comprising:
    receiving a natural language prompt input by a user of a design application, the natural language prompt requesting that the design application generate content described in the natural language prompt;
    analyzing the natural language prompt using a first language model trained to output a prediction whether the user intended to generate personalized content using a brand kit comprising a set of electronic assets providing example of a visual identity of a brand associated with the user;

responsive to the first language model outputting a prediction that the user intended to generate personalized content using a brand kit, obtaining a brand kit associated with the user;

generating intermediate content based on the natural language prompt by generating a plurality of first model-specific prompts using a prompt construction layer, each model-specific prompt of the first model-specific prompts being provided as an input to a respective generative model of a plurality of generative models associated with the designer application to cause the respective generative model to generate at least one aspect of the intermediate content; and customizing the intermediate content to create personalized content based on the brand kit by generating a plurality of second model-specific prompts using the prompt construction layer, each model-specific prompt of the second model-specific prompts being provided as an input to a respective generative model of the plurality of generative models to cause the respective generative model to generate at least one aspect of the personalized content based on the brand kit.

12. The method of claim 11, wherein the assets included in the brand kit include one or more of a color palette, one or more fonts, and a logo.

13. The method of claim 11, wherein receiving a natural language prompt input by the user of the design application further comprises receiving a sample image associated with the natural language prompt, and wherein generating the intermediate content based on the natural language prompt further comprises generating the intermediate content based on the natural language prompt and the samples image by generating a plurality of first model-specific prompts based on the natural language prompt and the sample image.

14. The method of claim 11, wherein obtaining the brand kit associated with the user further comprises:
 determining that the user is not associated with a brand kit; and
 generating the brand kit based at least in part on the natural language prompt and information associated with the user.

15. The method of claim 14, wherein generating the brand kit based further comprises generating the brand kit based at least in part on the natural language prompt, the information associated with the user, and one or both of features of a product or service identified in the natural language prompt and a target audience for the product or service.

16. A data processing system comprising:
 a processor; and
 a memory storing executable instructions that, when executed, cause the processor alone or in combination with other processors to perform operations of:
  receiving a natural language prompt input by a user of a design application, the natural language prompt requesting that the design application generate content described in the natural language prompt;
  analyzing the natural language prompt using a first language model trained to output a prediction whether the user intended to generate personalized content using a brand kit comprising a set of electronic assets providing example of a visual identity of a brand associated with the user;
  responsive to the first language model outputting a prediction that the user intended to generate personalized content using a brand kit, generating a brand kit associated with the user;
  generating intermediate content based on the natural language prompt by generating a plurality of first model-specific prompts using a prompt construction layer, each model-specific prompt of the first model-specific prompts being provided as an input to a respective generative model of a plurality of generative models associated with the designer application to cause the respective generative model to generate at least one aspect of the intermediate content; and
  customizing the intermediate content to create personalized content based on the brand kit by generating a plurality of second model-specific prompts using the prompt construction layer, each model-specific prompt of the second model-specific prompts being provided as an input to a respective generative model of the plurality of generative models to cause the respective generative model to generate at least one aspect of the personalized content based on the brand kit.

17. The data processing system of claim 16, wherein the assets included in the brand kit include one or more of a color palette, one or more fonts, and a logo.

18. The data processing system of claim 16, wherein receiving a natural language prompt input by the user of the design application further comprises receiving a sample image associated with the natural language prompt, and wherein generating the intermediate content based on the natural language prompt further comprises generating the intermediate content based on the natural language prompt and the samples image by generating a plurality of first model-specific prompts based on the natural language prompt and the sample image.

19. The data processing system of claim 16, wherein generating the brand kit based further comprises generating the brand kit based at least in part on the natural language prompt, information associated with the user, and one or both of features of a product or service identified in the natural language prompt and a target audience for the product or service.

20. The data processing system of claim 16, wherein the memory further includes instructions configured to cause the processor alone or in combination with other processors to perform operations of:
 performing brand-specific fact checks on the personalized content to identify aspects of the intermediate content which are factually incorrect; and
 correcting the aspects of the intermediate content which are factually incorrect.

* * * * *